US009058536B1

(12) United States Patent
Yuan et al.

(10) Patent No.: US 9,058,536 B1
(45) Date of Patent: Jun. 16, 2015

(54) IMAGE-BASED CHARACTER RECOGNITION (71) Applicant: Amazon Technologies, Inc., Reno, NV (US)

(72) Inventors: Chang Yuan, Seattle, WA (US); Geoffrey Scott Heller, Seattle, WA (US); Louis L. LeGrand, III, Seattle, WA (US); Daniel Bibireata, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 188 days.

(21) Appl. No.: 13/627,643

(22) Filed: Sep. 26, 2012

(51) Int. Cl.
*G06K 9/00* (2006.01)
*G06K 9/20* (2006.01)

(52) U.S. Cl.
CPC .................................. *G06K 9/2054* (2013.01)

(58) Field of Classification Search
None
See application file for complete search history.

(56) References Cited

U.S. PATENT DOCUMENTS

| | | | | |
|---|---|---|---|---|
| 2005/0259866 A1* | 11/2005 | Jacobs et al. | ............... | 382/157 |
| 2007/0189615 A1* | 8/2007 | Liu et al. | ............... | 382/232 |
| 2008/0101726 A1* | 5/2008 | Myers et al. | ............... | 382/289 |
| 2010/0246961 A1* | 9/2010 | Prasad et al. | ............... | 382/181 |
| 2010/0272360 A1* | 10/2010 | Huang | ............... | 382/182 |
| 2012/0243792 A1* | 9/2012 | Kostyukov et al. | ............... | 382/199 |
| 2012/0330646 A1* | 12/2012 | Andrade et al. | ............... | 704/7 |

OTHER PUBLICATIONS

Handley, Improving OCR Accuracy Through Combination: A Survey, 1998, Systems, Man, and Cybernetics, IEEE International Conference on. vol. 5., pp. 4330-4333.*
Fiscus, a post-processing system to yield reduced word error rates: Recognizer output voting error reduction (ROVER), 1997, in Automatic Speech Recognition and Understanding, Proceedings., IEEE Workshop on, pp. 347-354.*

* cited by examiner

*Primary Examiner* — Bhavesh Mehta
*Assistant Examiner* — David F Dunphy
(74) *Attorney, Agent, or Firm* — Novak Druce Connolly Bove + Quigg LLP (57) ABSTRACT

Various embodiments enable a computing device to capture multiple images (or video) of text and provide at least a portion of the same to a recognizer to separately recognize text from each image. Each of the recognized outputs will typically include one or more text strings for each image. Substrings common to each of the one or more text strings are computed and compared to each text string within each image to determine an alignment consensus for each substring within the text. A template string is generated that includes each common substring in a position corresponding to a determined alignment for a respective substring. A character frequency vote is then applied to unresolved portions and the final text string is determined by filling the unresolved spaces with the character having the highest occurrence rate for a respective space.

20 Claims, 7 Drawing Sheets

Image #1    _ _ _.theb_ _ _hhut.com

Image #2    www.the_eac_hut.com

Image #3    www.thebeaehhut_ _ _m

Image #4    www.theb_ _chhut.c0m

Image #5    _ww.the_ _ea_hhut.com

Image #6    www.thebeachhut.co_

Template String:    _ _ _.the_ _ _ _ _ _hut_ _ _ _ _

Merged String:    www.thebeachhut.com

FIG. 1 www.thebeachhut.com

FIG. 2A

Image #1

Image #2

Image #3

Image #4

Image #5

Image #6

| Image# | OCR Output | String #1 | String #2 | String #3 |
|---|---|---|---|---|
| 1 | .theb   hhut.com | .theb | hhut.com | — |
| 1 | www.the eac hut.corn | www.the | eac | hut.corn |
| 1 | www.thebeaehhut   m | www.thebeaehhut | m | — |
| 1 | www.theb  chhut.c0m | www.theb | chhut.c0m | — |
| 1 | ww.the  ea hhut.com | ww.the | ea | hhut.com |
| 1 | www.thebeachhut.co | www.thebeachhut.co | — | — |

Image #1      _ _ _.theb___hhut.com

Image #2      www.the_eac_hut.com

Image #3      www.thebeaehhut___m

Image #4      www.theb__chhut.c0m

Image #5      _ww.the__ea_hhut.com

Image #6      www.thebeachhut.co_

Template String:      _ _ _.the______hut_____

Merged String:      www.thebeachhut.com

IMAGE-BASED CHARACTER RECOGNITION

BACKGROUND

Optical character recognition (OCR) systems are generally used to detect text present in an image and to convert the detected text into its equivalent electronic representation. In order to accurately recognize text with a conventional OCR engine, the image typically needs to be of a high quality. The quality of the image depends on various factors such as the power of the lens, light intensity variation, relative motion between the camera and text, focus, and so forth. Generally, an OCR engine can detect a majority of text characters in good quality images, such as images having uniform intensity, no relative motion, and good focus. However, even with good quality images, conventional OCR engines are still often unable to accurately detect all text characters. This imprecision is further exacerbated when attempting to recognize text from lesser quality images, such as images containing variations in lighting, shadows, contrast, glare, blur, and the like. As technology advances and as people are increasingly using portable computing devices in a wider variety of ways, it can be advantageous to adapt the ways in which images are processed by an OCR engine in order to improve text recognition precision.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to recognizing text in an image. In particular, various approaches provide a method of recognizing text image by comparing multiple images or image frames including that text, and then analyzing those images to come to a consensus as to the characters represented in the text. In at least some embodiments a set of common strings can be determined between the images, and a voting or similar process can be used to determine characters in locations that do not necessarily match corresponding characters in at least a majority of the other multiple images.

In at least one embodiment, a computing device can capture multiple images (or video) of text and provide the at least a portion of the same to an optical character recognizes to separately recognize text from within each image. The multiple OCR outputs corresponding to the multiple images will typically include one or more text strings extracted from each image. Substrings common to each of the one or more text strings are computed using a longest common substring (LCS) algorithm and each substring is then compared to each text string to determine an alignment consensus for each substring within the text. A template string is generated that includes each common substring in a position corresponding to the consensus alignment for a respective substring. For the unresolved spaces or portions of the text between or adjacent the common substrings, a character frequency vote for each space is taken to determine the character with highest occurrence. The final text string is then determined by filling the unresolved spaces with the highest occurrence character for a respective space. At least a portion of these tasks can be performed on a portable computing device or using at least one resource available across a network as well.

Various other functions and advantages are described and suggested below as may be provided in accordance with the various embodiments.

Figure 1:
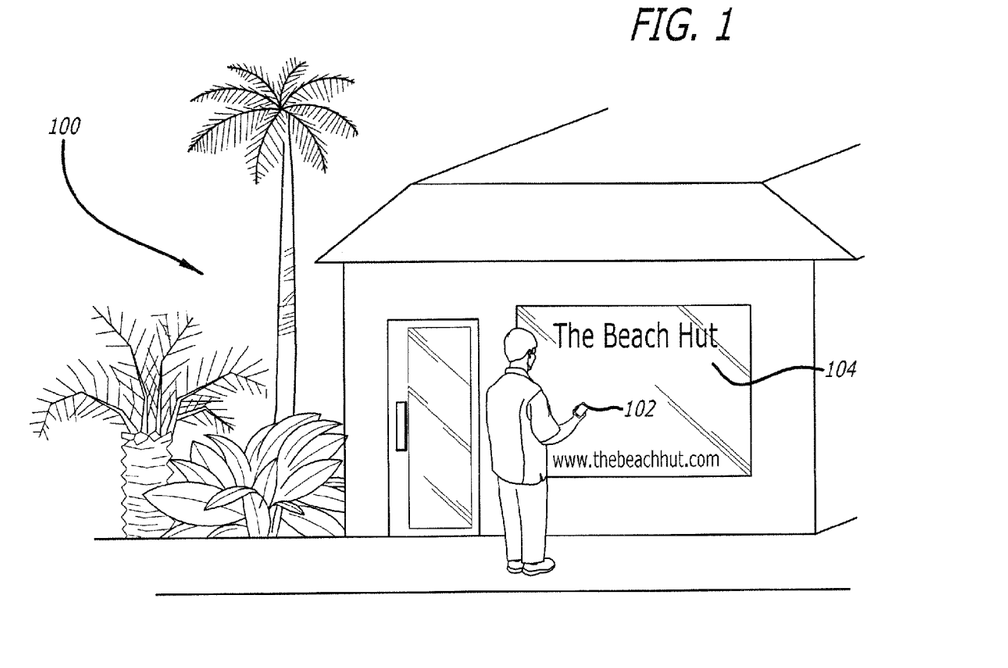
FIG. 1 illustrates an example situation where a user is attempting to recognize text with a computing device in accordance with various embodiments.

FIG. 1 illustrates an example situation 100 in which a user is pointing a camera of a computing device 102 toward a window 108 to recognize text of a web address printed thereon. Although a smart phone is shown, it should be understood that various other types of electronic or computing devices that are capable of determining and processing input can be used in accordance with various embodiments discussed herein. These devices can include, for example, tablet computers, notebook computers, desktop computers, personal data assistants, electronic book readers, video gaming controllers, and portable media players, among others. In accordance with various embodiments, instead of manually typing the address into the device's web browser, a user walking down a street could point the camera of the computing device 102 at the web address to recognize and subsequently provide the text to the browser as a shortcut to navigate the user thereto, for example.

In this example, however, since the user is walking, obtaining an accurate OCR output from a random single image can be a challenge. The outside world is filled with less than ideal conditions, such as poor or varied lighting, movement during image capture, and other circumstances, that make capturing an image ideal for processing by a conventional optical character recognizer (OCR) difficult. Further, given people's busy schedules, taking the time and care to capture an ideal image in a moving environment, such as in a user's hand, is not necessarily practical and likely not to be expected. It can, thus, be advantageous to integrate information from multiple images (or video) in order to piece together textual details that may be blocked, indistinguishable, or obscured in a single image to generate a more accurate text recognition output. In this example, depending on the location of the sun in FIG. 1, glare reflecting off the window 108 could block or obscure a portion of text from a certain angle resulting in an incomplete textual output if only a single image from that angle were processed by a conventional OCR engine. Thus, in one embodiment, upon obtaining an image and/or identifying one or more portions of the image having properties that indicate the presence of text, an application on the device 102 may automatically (or upon user initiation/direction) capture multiple images and run an OCR algorithm (or send the images to at least one resource available across a network to perform the analysis) to separately recognize text within each image.

FIGS. 2A-2D illustrate an example step-by-step representation of a process for determining an accurate text string from multiple OCR outputs of the web address of FIG. 1. FIG.

Figure 2A:
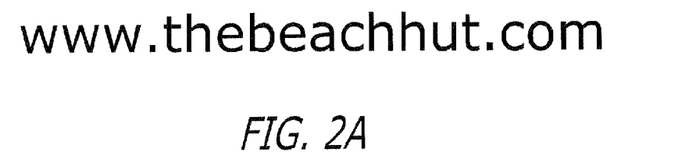
FIGS. 2A-2D illustrate an example visual representation of a process of recognizing text in accordance with at least one embodiment.
Figure 2B:
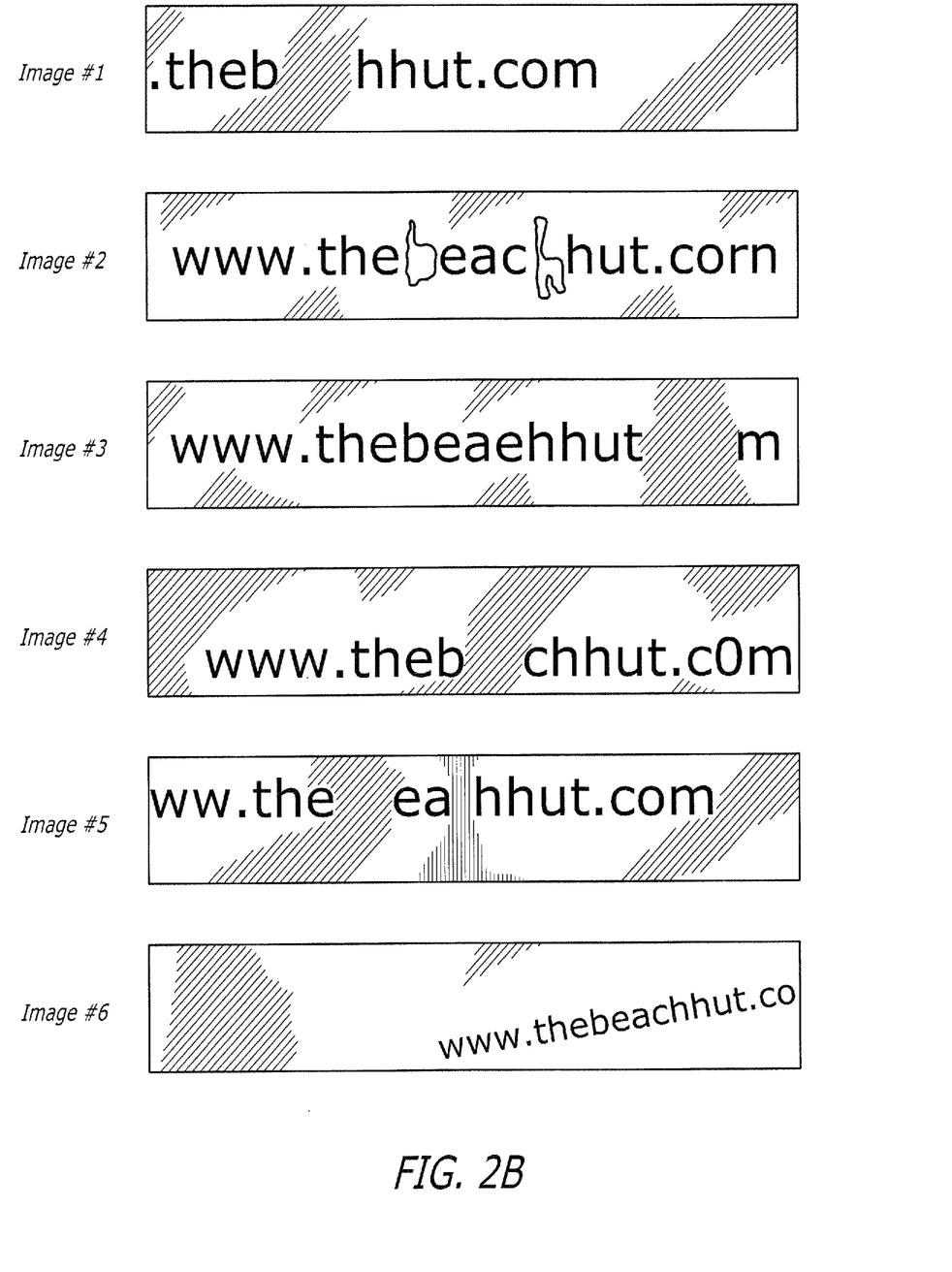

2A illustrates a zoomed in view of the web browser text displayed on the window 108 from FIG. 1. In this example, the text is a web address for a restaurant, "www.thebeachhut.com." As mentioned above, the computing device captures multiple images of the web address, six images in this example, and separately processes each of the images with an OCR engine, which results in an output of recognized text for each image. In this example, "www.thebeachhut.com" is a single string, however, the OCR engine will often miss characters within a string due, for example, to glare over certain characters, as illustrated in FIG. 2B, which the OCR engine could interpret as a space (or absence of a character) and, thus, return multiple strings (or characters next to each other without breaks or spaces). FIG. 2B, illustrates six example images of the web address. In this example, each image includes an image imperfection, such as glare, blur, or alignment which lead to at least a portion of the characters of the string of text to be obscured or missing. In this example, Image #s 1, 5, and 6 are not centered resulting in a portion of their characters to be missing from the image; Image #s 1, 3, 4, and 5 have characters obscured by glare; and Image #2 includes fuzzy or blurry characters. Thus, each of these images is individually processed by an OCR engine and a list of one or more strings is returned for each image.

Before the OCR engine analyzes any text, the engine will identify (pixel) boundaries for a suspected strings or characters. These boundaries collectively are called a bounding box, which is the coordinates of a rectangular border around a string of text or individual character within an image. After processing, a method in accordance with at least one embodiment returns a list of one or more strings for each image and a set of bounding boxes of regions within the image mapped to each string.

Figure 2C:
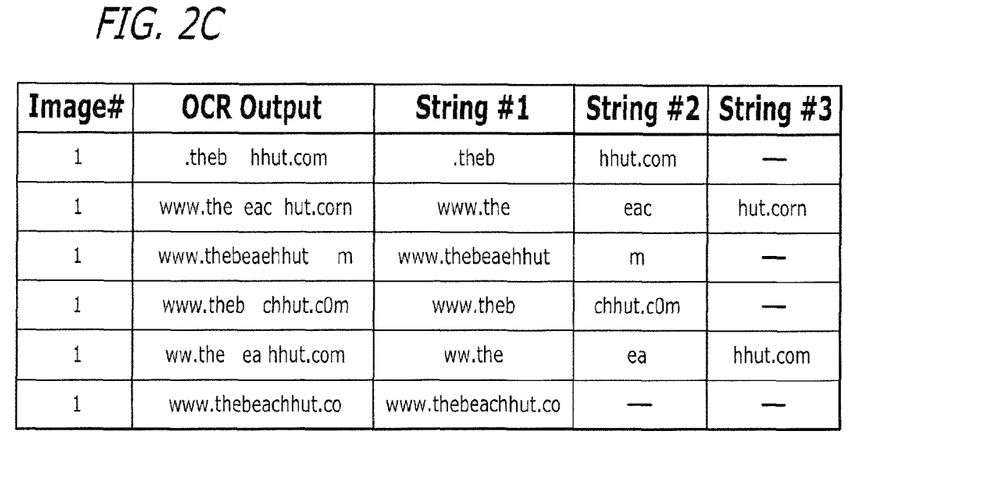

FIG. 2C shows a table that includes the raw OCR output for the six images of FIG. 2B and respective substrings of the output for each of the six images. Once each image has been separately processed by the OCR engine, an inter-image transform (homography matrices or algorithm) is applied, particularly if the camera has been moving during capture, to warp each bounding box from each of the strings in Images #2-6 to their corresponding bounding box in a base image, or Image #1, in this example. The inter-image transform is applied to determine if the warped bounding box from each image overlaps with any existing bounding boxes in Image #1. If a respective bounding box overlaps to within a predetermined confidence level, the respective string is added to a text string list for the respective image. Otherwise the string is discarded. At the end of this process, each substring for a respective image has been identified and provided in a list, as represented in FIG. 2C.

Although six images are represented in the table, it should be understood that any number of images, such as thirty images or more, could be captured and separately processed with an OCR engine to recognize text, in accordance with various embodiments. Further, the images could be sequentially captured, such as capturing consecutive frames from a video, or the images could be captured at intervals in a sequence of frames, such as capturing every fifth, twentieth, fiftieth, or other frame in a sequence. The images could also be captured based on a time interval, such as capturing an image every two hundred and fifty milliseconds. These number are mere examples and subject to variation depending on the frame rate of capture for a particular camera. Ideally, each image is slightly different compared to other images to produce an accurate result because, for example, glare in an image would likely appear in image frames immediately before and after the image in question. It can, therefore, be advantageous, under some circumstances, to achieve some variation among the captured images. Variation among images, such as images captured from slightly different angles, can be achieved by spacing out the time interval between captures.

Figure 2D:
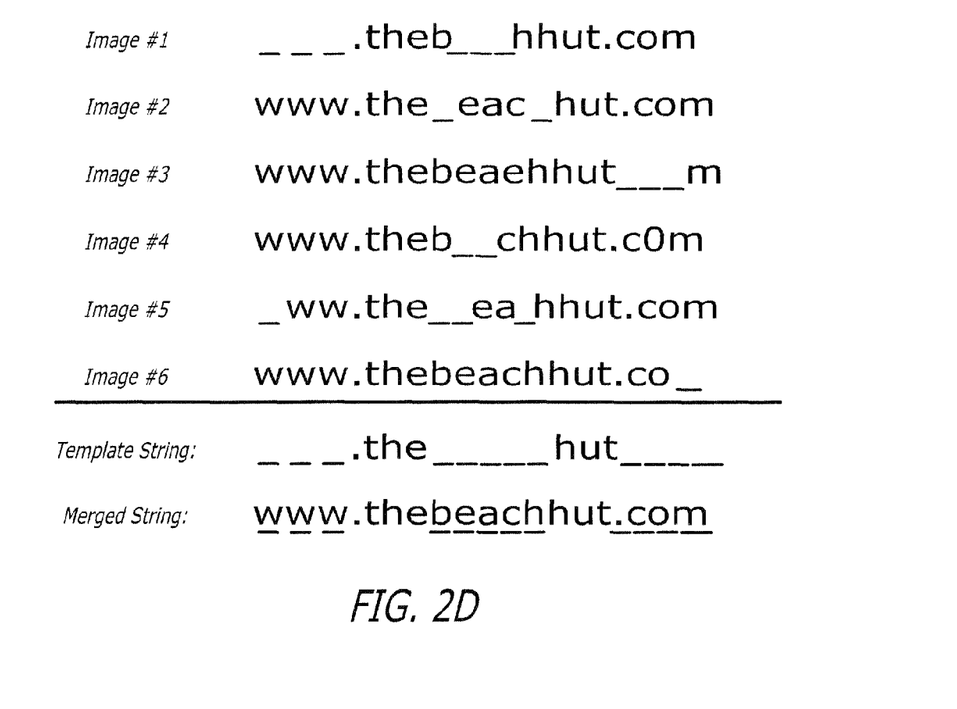

At this point, one or more substrings common to each OCR output for each image are determined using a longest common substring (LCS) algorithm. The one or more substrings are then compared to each OCR output string to determine their respective position or alignment within the overall string. FIG. 2D illustrates the raw OCR output for each image. In this example, Image #1 could have been captured off-center, thereby cutting off the "www," and the other images have missing characters in the middle of the web address or have misrecognized some characters, such as ".corn" instead of ".com" and ".c0m" instead of ".com." In this example, as shown in FIG. 2D, ".the" and "hut" are the determined common substrings, which again are the longest set of consecutive characters to appear in each OCR output. As mentioned above briefly, the common substrings ".the" and "hut" are compared to each OCR output from each image by, for example, analyzing occurrences of characters, or a sequence of characters, in a respective position. This can be achieved by taking a majority vote, calculating a probability distribution, or making a histogram of occurrence of each character, or sequence of characters (common substrings), in a particular location within the recognized string of text for each image. For example, referring to FIG. 2D, Image #1 is missing the "www" and, thus, the substring ".the" occupies the first four spaces (or character locations) of Image #1's OCR output. The ".the" substring, however, occupies the $4^{th}$-$7^{th}$ spaces for the OCR outputs of Image #2-6. Therefore, based on the number of occurrences, the ".the" substring is determined to occupy the $4^{th}$-$7^{th}$ spaces. The alignment of the "hut" substring is determined in substantially the same manner. The common substring are then positioned in their determined alignment position to create a template string that uses these common substrings as anchor points for determining the remainder of the characters in the string.

In at least one embodiment, image information could be used as an alternative to the raw OCR output for determine the alignment of the common substrings. For example, the relative positions between bounding boxes can be used as a guide to merge the strings. If a character-level bounding box is available, the boxes around the characters for each common substring can be used to compute a similarity transform (i.e. scaling, rotation, translation) based on corresponding matching bounding boxes. In at least one embodiment, a template matching algorithm, such as Normalized Cross Correlation algorithm, can be applied to align a text region in one image to corresponding regions of other images. The template matching algorithm is usually robust to image noise and artifacts, including missing characters. Since a respective text region is typically much smaller than the whole image, this process can be relatively fast.

Referring back to FIG. 2D, a template string is generated by placing each of the common substrings in the respective determined alignment position with blank spaces based on locations with unresolved characters before, after, and between the common substrings. In this example, there are three blank spaces at the beginning of the template string, then the common substring ".the," five more blank spaces, then the common substring "hut," and then four more blank spaces at the end of the template string. The unresolved characters of the blank spaces within the template string are then determined by analyzing occurrences of the characters that appear in a respective space, such as by taking a majority vote or producing a histogram of character occurrences for each blank. After determining the majority character of occurrence for a respective blank, the determined majority characters are inserted into their respective blanks in the template string to form a merged string of text as represented in the image, which, in this example, is "www.thebeachhut.com." The merged string of recognized text, as mentioned above, includes an electronic representation of the characters in the captured images and the electronic representation can then be utilized by the computing device to navigate a user to a web address, save a person's contact information, obtain map information and/or directions to a physical address, copy a message to a notepad or word processing document, and the like.

In at least some embodiments, the OCR engine can also return a confidence level for a particular character and alternative characters for each position within a string. For example, space #11 of Image #2 was misrecognized by the OCR engine by returning an 'e' instead of the correct character 'c.' In this example, the OCR engine could have provided a confidence level of 45% for the character 'e,' a confidence level of 40% for the character 'c,' and a confidence level of 15% for a character 'z.' The alternative characters can then be utilized when comparing characters in the same respective position from other images upon analyzing character occurrences. The confidence levels provides an additional level of accuracy by providing a number between 0 and 1, instead of just 0 or 1. The confidence levels can also be affected by the image quality, especially when an image is out-of-focus or blurry. Typically, if the image is out-of-focus, the confidence for the characters extracted from the image will be lower than an image that is in focus. Further, it is common to find multiple text targets having inherent relationships, e.g., web address, email, phone numbers, which can be used, along with the highest confidence level characters, as a keyword for a web search and use the search results to validate the OCR engine results. In this manner, multiple references (OCR engine and web search engines) are utilized to generate an optimal result. In addition, the computing device can also be in communication with a system including a database of words for which to cross reference particular sequences of characters for providing an additional confidence check.

In at least one embodiment, instead of submitting each image to the OCR engine, pre-processing and recognition algorithms could be applied to the first image only to identify at least one region of interest (ROI) within the first image. Then the ROI of the first image can be mapped to subsequent images. In at least one embodiment, if a certain frame is out of focus, an image sharpening algorithm, such as an unsharp masking algorithm, can be applied to improve the image quality before the image is sent to the OCR engine. In at least one embodiment, a user could also be notified or alerted when the images the user is capturing are of low quality, due to movement, for example, and the computing device could guide the user to keep the camera still or otherwise instruct the user while capturing an image to improve the image quality.

Figure 3:
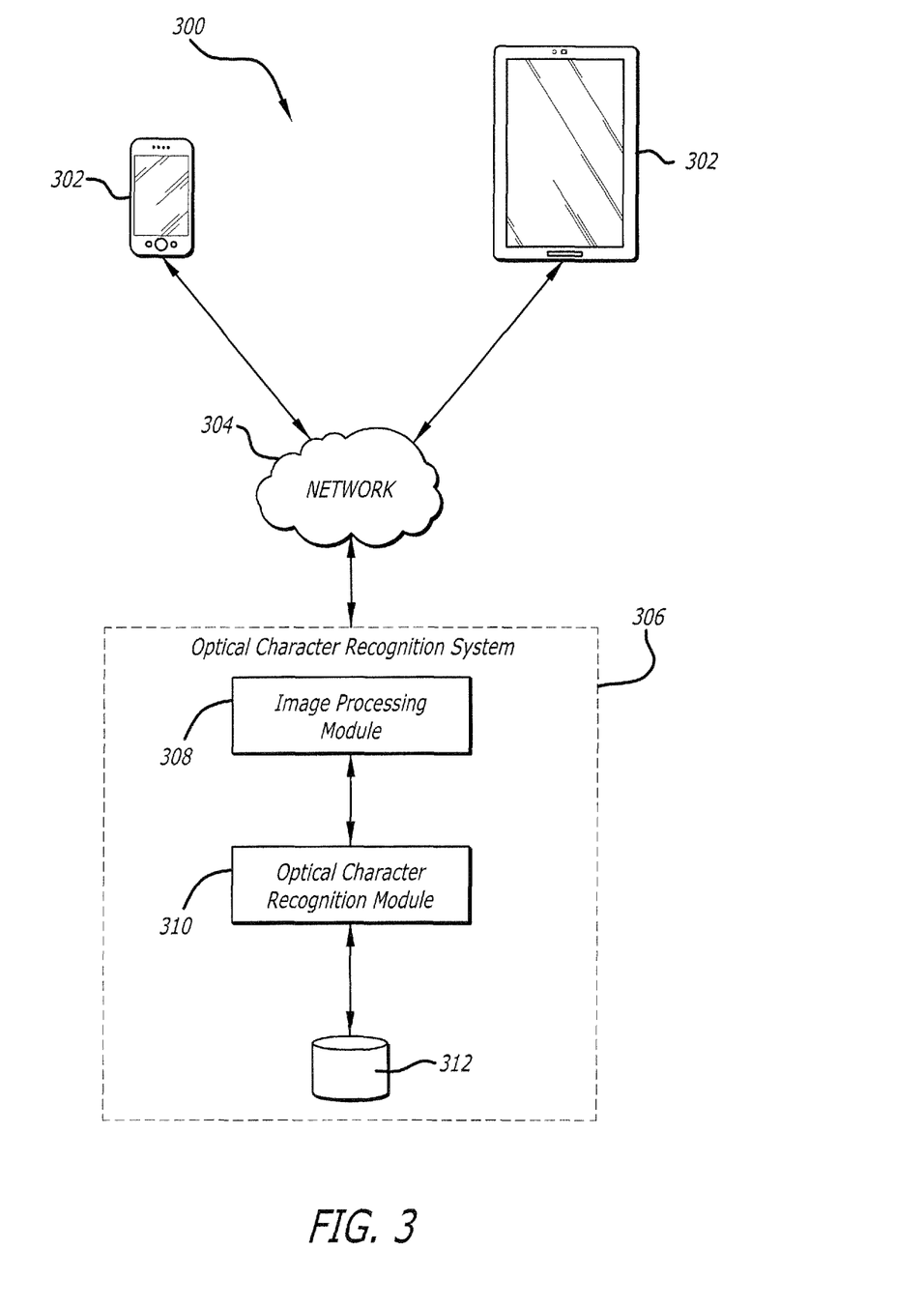
FIG. 3 illustrates an example environment in which various embodiments can be implemented.

FIG. 3 is an example environment 300 in which a user can utilize a computing device to recognize text from multiple images, in accordance with various embodiments. It should be understood that the example system is a general overview of basic components, and that there can be many additional and/or alternative components utilized as known or used in the art for recognizing text in multiple images. In this example, a user is able to utilize a client device 302, such as a personal computer, tablet computer, smart phone, and the like, to access an Optical Character Recognition system or service 306 over at least one appropriate network 304, such as a cellular network, the Internet, or another such network for communicating digital information. As described above, the client device 302 can capture one or more images (or video) of text and send the images to the Optical Character Recognition system or service 306 over the at least one appropriate network 304. The Optical Character Recognition system 306 includes an image-processing module 308 that can apply different operators or techniques to pre-process the images before submitting the images to an optical character recognition module 310. Examples of the operators include a Laplacian-or-Gaussian filter, thresholding filters, and so forth, which enhance or mitigate different characteristics of the images. Examples of these characteristics include intensity, blurriness, and so forth. After pre-processing, the optical character recognition module 310 separately and independently recognizes text from within each image to produce multiple raw OCR outputs comprising a set of characters strings and location information of the characters in each image. In at least one embodiment, a processor can analyze and process the detected location information of the characters using a database 312 of words in order to improve the recognition of the text in image. The database 312 includes a set of words which the processor can search for matches corresponding to words present in the raw OCR output and location information for the set of words in order to recognize specific configurations of the characters. The processor can further compute the common substrings using the longest common substring (LCS) algorithm, compares each common substring to each text string to determine the alignment, and generates a template string. For the unresolved spaces or portions of the text between or adjacent the common substrings, the processor calculates a character frequency vote for each space to determine the character with highest occurrence. The final text string is then determined by filling the unresolved spaces with the character having the highest occurrence rate for a respective space. At least a portion of these tasks can be performed on a portable computing device or by using at least one resource available across a network as well. In at least some embodiments, an OCR application will be installed on the client device 302, such that much of the processing, analyzing, or other such aspects can be executed on the client device. Various processing steps can be performed by the client device 302, by the Optical Character Recognition system 306, or a combination thereof. Therefore, it should be understood that the components and capabilities of the Optical Character Recognition system 306 could wholly or partly reside on the client device 302.

Figure 4:
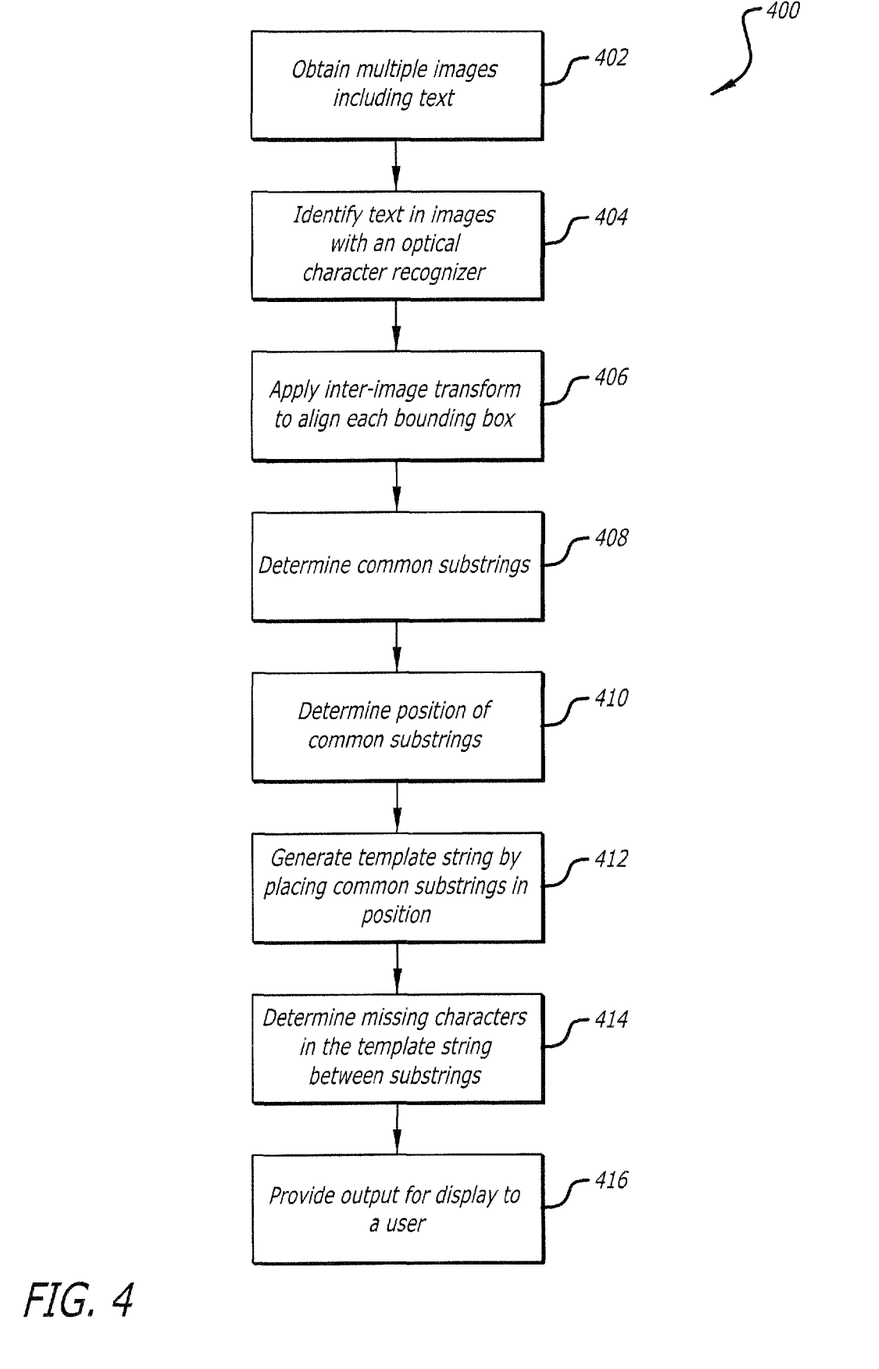
FIG. 4 illustrates an example process of recognizing text in accordance with at least one embodiment.

FIG. 4 illustrates an example process 400 for recognizing text in an image with a computing device that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a plurality of images containing text captured by a computing device is obtained 402. Each of the images represents substantially the same text target and may include at least one visual imperfection, such as blurriness, glare, shadows, and the like. In this and other examples, the images could undergo and pre-processing stage including the application of various algorithms to remove certain aspects of one or more images or to remove aspects of one or more images in order to be more reliably read by the OCR engine. In this example, a string of characters associated with the text captured in at least a portion of the plurality of images is identified by processing each of the plurality of images separately or independently with an optical character recognition engine 404. Further, the OCR engine additionally returns the associated bounding boxes for each string of characters. In this example, a base image for comparing subsequent images is determined and an inter-image transform is applied to warp each bounding box within each subsequent image to a corresponding bounding box of the base image 406. Common substrings among the identified string of characters for each image are determined using a longest common substring algorithm 408. A position of each of the common substrings is determined by analyzing occurrences of characters in a respective position upon comparing the common substrings to the string of characters from each image 410. As mentioned elsewhere herein, a majority vote process, such as calculating a probability distribution of occurrence of each character in a particular location within the recognized string, can be applied as a means of determining the position of each common substring. A template string is generated by placing each common substring in a respective determined position 412. In this example, the missing characters in the template string between and adjacent the common substrings are determined by analyzing occurrences of individual characters to form a merged string 414. In order to determine the missing characters, a majority vote process, such as one described above, can additionally be used in this step. Finally, a merged string is produced including a complete and substantially accurate electronic representation of the text from the images is provided either for display, or for use by an application, for a user of the computing device 416.

Figure 5A:
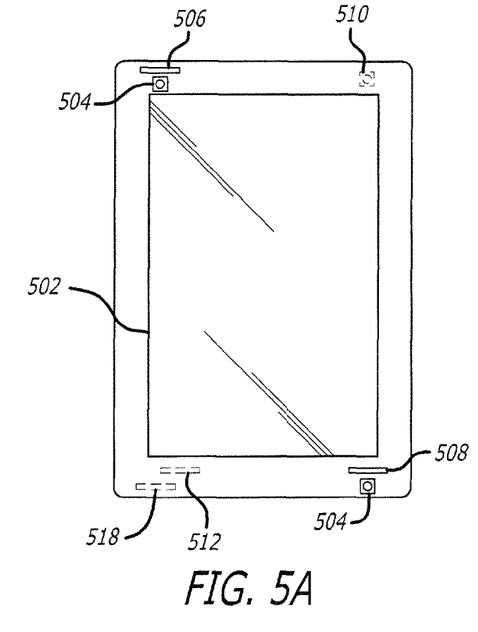
FIGS. 5A and 5B illustrates an example computing device that can be used to implement aspects of various embodiments.
Figure 5B:
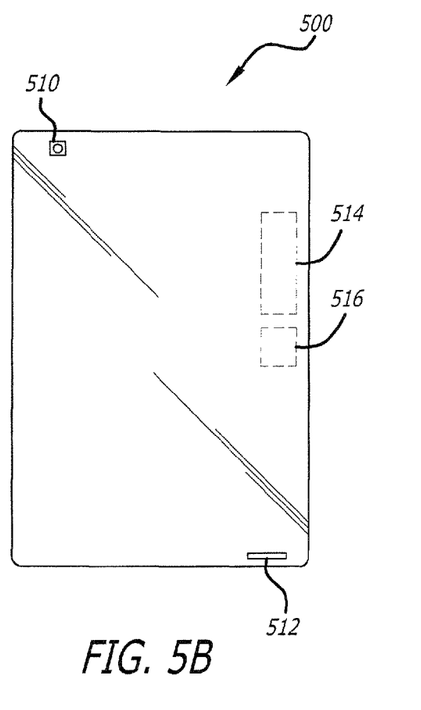

FIGS. 5A and 5B illustrate front and back views, respectively, of an example electronic computing device 500 that can be used capture images and at least facilitate the recognition of text therein, in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
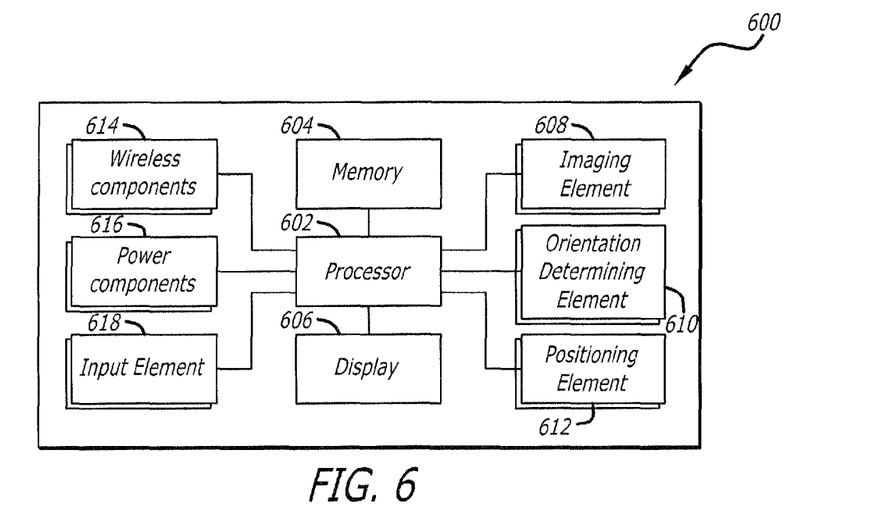
FIG. 6 illustrates example components that can be used with a device such as that illustrated in FIGS. 5A and 5B.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, text, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
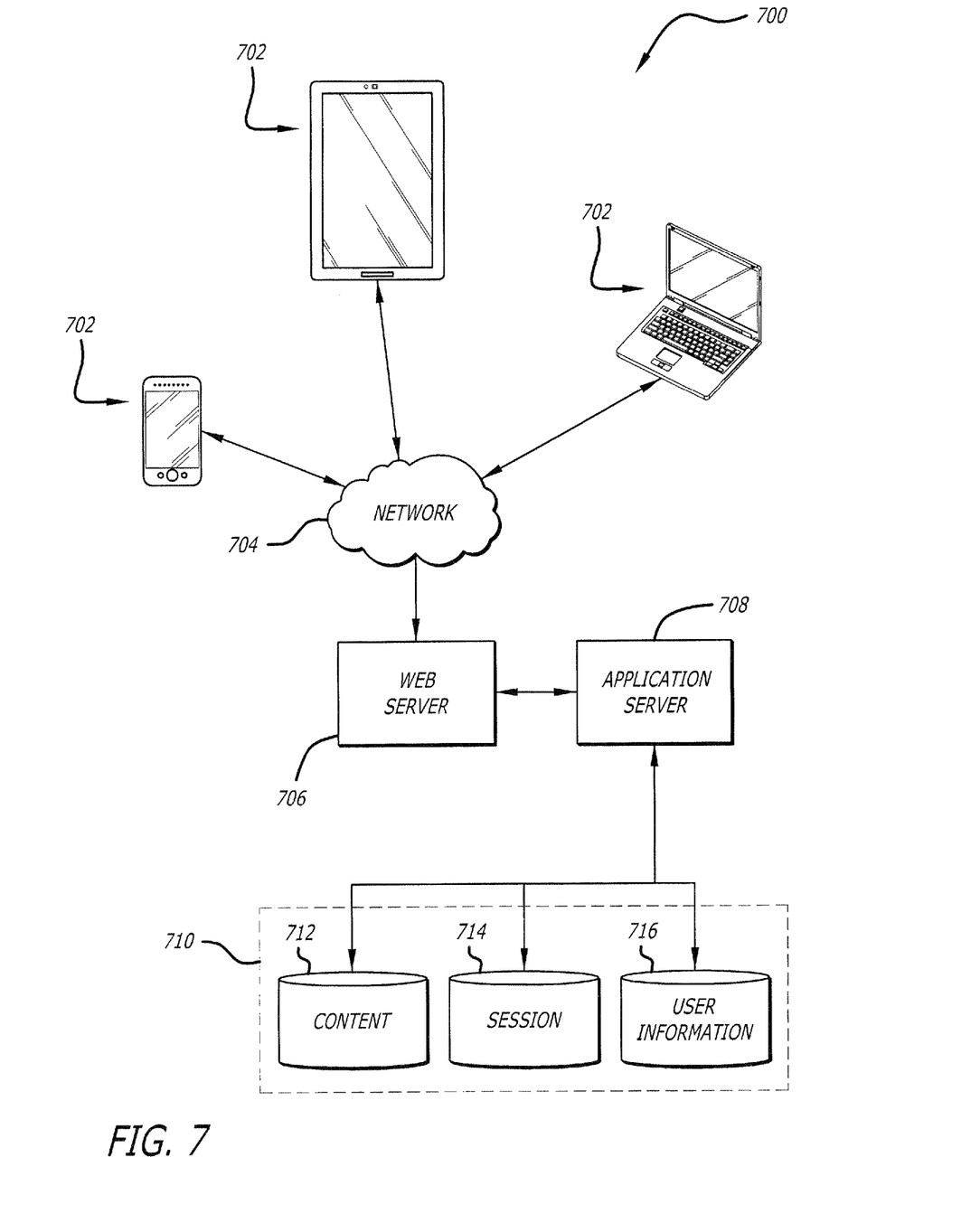
FIG. 7 illustrates another example environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method performed by a portable computing device, comprising:
   obtaining a first image of text at a first angle of view relative to the text using a camera of the portable computing device;
   obtaining at least one second image of the text at a second angle of view relative to the text;
   processing the first image and the at least one second image using a character recognition algorithm;
   identifying a respective string of characters and a respective bounding box for the respective string of characters associated with the text of the first image and the at least one second image;
   determining, using a longest common substring algorithm, a substring that is common to the first image and the at least one second image;
   determining, for the substring, a respective first position of the substring within the respective string of characters of the first image and the at least one second image;
   generating a template string that includes the substring, wherein a second position of the substring within the template string is based, at least in part, on the respective first position of the substring within the respective string of characters of the first image and the at least one second image;
   determining one or more missing characters in the template string by analyzing occurrences of characters in the respective string of characters of the first image and the at least one second image; and
   generating a merged string for display on the portable computing device, the merged string including the template string and the one or more missing characters.

2. The computer-implemented method of claim 1, wherein determining the one or more missing characters includes applying a majority vote process to determine the occurrences of characters in the respective string of characters of the first image and the at least one second image.

3. The computer-implemented method of claim 1, wherein determining the respective first position of each of the one or more substrings includes:
   comparing the one or more substrings to the respective string of characters from the first image and the at least one second image; and
   analyzing the occurrences of the one or more substrings in the respective string of characters of the first image and the at least one second image.

4. The computer-implemented method of claim 1, further comprising:
   searching a database for potentially matching words based on one or more of the respective string of characters of the first image and the at least one second image; and
   replacing at least a portion of the one or more of the respective string of characters of the first image and the at least one second image with a potentially matching word based on confidence scores associated with the potentially matching words.

5. A computer-implemented method performed by a portable computing device, comprising:
   obtaining a first image including a first view of text at a first angle of view relative to the text;
   obtaining at least one second image including a second view of the text at a second angle of view relative to the text;
   processing the first image and the at least one second image using a character recognition algorithm to identify respective characters in the text of the first image and the at least one second image and a respective bounding box for the respective characters of the first image and the at least one second image;
   identifying at least one substring of text that is common to the first image and the at least one second image;
   determining one or more characters associated with an unresolved portion of the text based at least in part on an analysis of the respective characters of the first image and the at least one second image; and
   merging the one or more characters associated with the unresolved portion with the at least one substring of text.

6. The computer-implemented method of claim 5, wherein determining the one or more characters associated with the unresolved portion of the text includes applying a majority vote process.

7. The computer-implemented method of claim 5, wherein the one or more characters associated with the unresolved portion and the at least one substring is provided to an application executing on the portable computing device.

8. The computer-implemented method of claim 5, further comprising:
   providing, by the character recognition algorithm, a respective confidence level for each character of the respective characters of the first image and the at least one second image; and
   based at least in part on the respective confidence level, providing at least one alternative character for at least one character of the respective characters of the first image and the at least one second image.

9. The computer-implemented method of claim 5, further comprising:
   determining a respective position of the at least one substring in the respective characters of the first image and the at least one second image by comparing the at least one substring to the respective characters of the first image and the at least one second image; and
   analyzing occurrences of the at least one substring in the respective characters in the first image and the at least one second image.

10. The computer-implemented method of claim 5, further comprising:
    detecting blurriness of at least one image, from among the first image or the at least one second image; and
    applying an unsharp masking algorithm to sharpen the at least one image.

11. The computer-implemented method of claim 5, wherein:
    the first view includes a first portion of the text;

the second view includes a second portion of the text that differs from the first portion of the text by at least one character or white space; and the unresolved portion includes the at least one character or white space.

12. A portable computing device, comprising:

a processor; and memory including instructions that, when executed by the processor, cause the portable computing device to:

obtain a first image including a first view of text at a first angle of view relative to the text;

obtain at least one second image including a second view of the text at a second angle of view relative to the text;

process the first image and the at least one second image using a character recognition algorithm to identify respective characters in the text of the first image and the at least one second image and a respective bounding box for the respective characters of the first image and the at least one second image;

identify at least one substring of the text that is common to the first image and the at least one second image;

determine one or more characters associated with an unresolved portion of the text based at least in part on an analysis of the respective characters of the first image and the at least one second image; and merge the one or more characters associated with the unresolved portion with the at least one substring of text.

13. The portable computing device of claim 12, wherein at least one image, from among the first image and the at least one second image, differs from other images by at least one visual aspect, the at least one visual aspect including at least one of blurriness, orientation, or at least one lighting effect.

14. The portable computing device of claim 12, wherein the instructions, when executed, to cause the portable computing device to determine the one or more characters associated with the unresolved portion of the text includes applying a majority vote process.

15. A non-transitory computer-readable storage medium storing instructions that, when executed by at least one processor of a portable computing device, cause the portable computing device to:

obtain a first image including first view of text at a first angle of view relative to the text;

obtain at least one second image including a second view of the text at a second angle of view relative to the text;

process the first image and the at least one second image using a character recognition algorithm to identify respective characters in the text of the first image and the at least one second image and a respective bounding box for the respective characters of the first image and the at least one second image;

identify at least one substring of text that is common to the first image and the at least one second image;

determine one or more characters associated with an unresolved portion of the text based at least in part on an analysis of the respective characters of the first image and the at least one second image; and merge the one or more characters associated with the unresolved portion with the at least one substring of text.

16. The non-transitory computer-readable storage medium of claim 15, wherein the instructions, when executed, to cause the portable computing device to determine the one or more characters associated with the unresolved portion of the text includes applying a majority vote process.

17. The non-transitory computer-readable storage medium of claim 15, wherein the instructions, when executed, further cause the portable computing device to:

provide, by the character recognition algorithm, a respective confidence level for each character of the respective characters of the first image and the at least one second image; and based at least in part on the respective confidence level, provide at least one alternative character for at least one character of the respective characters of the first image and the at least one second image.

18. The non-transitory computer-readable storage medium of claim 15, wherein the instructions, when executed, further cause the portable computing device to:

search a database for potentially matching words based on one or more of the respective characters of the first image and the at least one second image; and replace at least a portion of the one or more of the respective characters of the first image and the at least one second image with a potentially matching word based on confidence scores associated with the potentially matching words.

19. The non-transitory computer-readable storage medium of claim 15, wherein the instructions, when executed, further cause the portable computing device to:

determine a respective position of the at least one substring in the respective characters of the first image and the at least one second image by comparing the at least one substring to the respective characters of the first image and the at least one second image; and analyze occurrences of the at least one substring in the respective characters of the first image and the at least one second image.

20. The non-transitory computer-readable storage medium of claim 15, wherein the one or more characters associated with the unresolved portion and the at least one substring of text is provided to an application executing on the portable computing device.

* * * * *